May 15, 1934. R. B. OTWELL 1,959,139
SEED OR EMBRYO PLANT PLANTING CARTRIDGE
Filed May 9, 1933
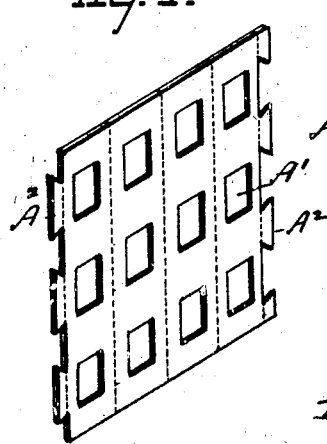
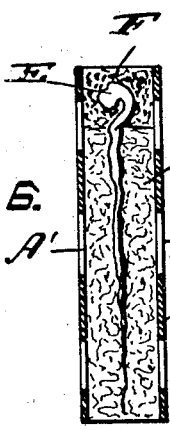
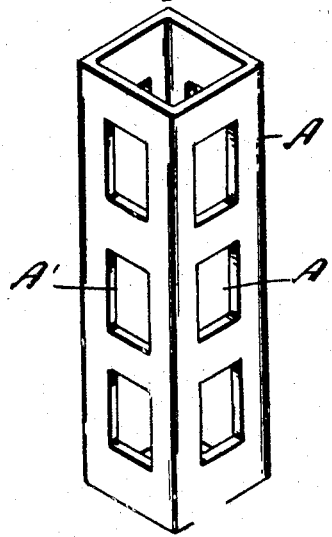
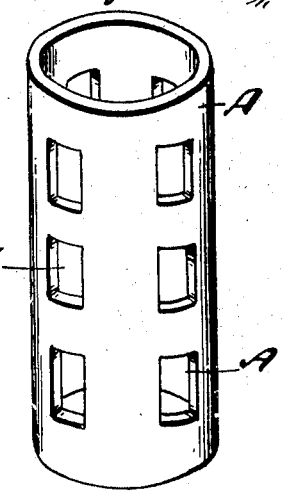
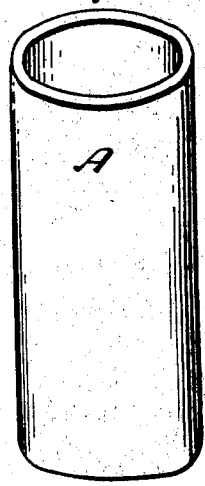
Inventor
Ralph B. Otwell
By S. E. Thomas
Attorney Patented May 15, 1934

1,959,139

UNITED STATES PATENT OFFICE 1,959,139

SEED OR EMBRYO PLANT PLANTING CARTRIDGE

Ralph B. Otwell, Detroit, Mich.

Application May 9, 1933, Serial No. 670,111

12 Claims. (Cl. 47—37)

My invention relates to a seed cartridge designed to be filled with moss, peat, sand or other suitable material in which garden seed may be lodged and caused to germinate and whereby the sprouted seeds or young plants may be bedded directly in the ground without removal from the cartridge, thereby protecting the plant and its root system from injury. Attention is called to the co-pending application filed by me May 9, 1933, Serial No. 670,110, patented November 28th, 1933, No. 1,936,988.

The present invention primarily consists of a cartridge or tube of suitable length and rigidity,—open at each end—with additional apertures through the wall between the open ends for the passage of moisture to the embryo plant, and through which the lateral roots of the plant may extend into the surrounding soil when bedded in the earth.

The seed or embryo plant cartridge is preferably constructed of transparent material for example gelatine of sufficient rigidity that it may serve as a dibble and be pushed into the ground without buckling, the cartridge being either labeled with the name of the plant inclosed therein, or its name may be embossed or printed in the wall of the cartridge as desired.

One feature of the invention is the dual purpose of the cartridge which serves not only as a housing for the seed and embryo plant and the material in which the seed is lodged and caused to germinate, but as a dibble in which the soil of the garden bed and the material in the cartridge in which the seed or embryo plant is bedded, may be joined and compacted upon forcing the cartridge containing the plant into the ground.

The seed cartridge may be either cylindrical or of other suitable form in cross-section, and it may be constructed ready for immediate use,— or as a blank, adapted subsequently to be shaped into either a cylindrical or other form in cross-section,—the blank being constructed with locking edges, which when brought together to form a tube, are adapted to interlock, forming a cartridge ready to receive the seed, and material in which the seed is bedded.

The primary object of the present invention is to provide for the germination of garden seed in a cartridge before planting in the ground,—the embryo plant being thereby protected from injury, with the advantage of a much earlier seasonal start than seeds that are planted in an outdoor bed.

Furthermore, by providing a transparent cartridge, the gardener may determine at once if the seeds have germinated and the probability of the plant growing when transferred to the ground, which is not always true of seed planted directly in an outdoor bed; there need therefore be no loss of seed or time, or disappointment resulting from the growing qualities of the seed.

A further advantage of the invention is that the gardener need buy no more seed for his garden bed than is necessary, as in buying cartridge germinated seeds or plants, he is able to determine at once whether they are in healthy condition and the number of plants required to fill a certain space.

With the foregoing and other objects in view which will appear as the description proceeds, the invention further resides in the combination and arrangement of such details as will be hereinafter described and claimed, it being understood that changes may be made in the precise embodiment of the invention herein disclosed without departing from the spirit of the same.

In the drawing accompanying this specification:

Figure 1 is a perspective view of a seed cartridge blank before shaping it into tubular form with its abutting edges interlocked.

Figure 2 is a perspective view showing the blank shaped into tubular form with the abutting edges of the blank interlocked.

Figure 3 is a vertical longitudinal sectional view through the seed cartridge, showing the latter filled with peat, moss, damp sand, earth or other suitable material in which the seed is to be lodged.

Figure 4 is a similar cross-sectional view showing a seed resting upon the surface of the peat, sand or other like material housed in the cartridge.

Figure 5 is a vertical cross-sectional view showing the seed housed in the cartridge covered with moss or peat.

Figure 6 is a vertical cross-sectional view through the cartridge showing a sprouted seed and its downwardly extending tap root.

Figure 7 is a cross-sectional view through the cartridge showing an embryo plant with its tap root extending downwardly and other roots running laterally toward and through slotted openings in the wall of the cartridge.

Figure 8 is a perspective view of a modification of the cartridge in tubular form, square in cross-section, ready for immediate use.

Figure 9 is a perspective view of a seed planting cartridge, circular in cross-section.

Figure 10 is a perspective view of a seed planting cartridge with the slotted openings in the wall of the cartridge eliminated.

Referring now to the reference characters placed upon the drawing:

A denotes a cartridge or tube of suitable length and rigidity, serving as a container for a seed B, bedded in a suitable plant sustaining element C, lodged therein.

The cartridge A is preferably transparent and may be constructed of a gelatinous, or cellulose substance,—such as celluloid. It may be either round, square or of other form in cross-section, and while not establishing an arbitrary size for the combined plant container and dibble, it has been found in practice that a cartridge about 2½ inches long and ½ inch square in cross-sectional area is quite satisfactory in the majority of cases and sufficiently rigid that it may be readily pushed into the soil D without disturbing or removing the plant E, or in anyway injuring the latter.

The pressure employed to force the cartridge into the garden bed serves to compact the soil in the bed in alignment with the penetrating cartridge, and also consolidates the material lodged in the cartridge, uniting it in a compact mass with the surrounding soil,—which also enters the opening $A^1$, through the side wall of the cartridge, thus connecting the soil of the garden bed with the material in the cartridge in which the embryo plant is embedded, thereby effecting a capillary bond, which is a most desirable desideratum.

The several openings $A^1$, through the wall of the cartridge permit the passage of the lateral roots $E^2$ of the plant to enter the soil in which it is bedded and also serve to admit moisture from the surrounding soil into the cartridge.

F indicates a layer of moist sand or the like overlapping the seed B embedded in the peat lodged in the cartridge. The seed may be previously soaked before planting it in the peat or moss that it may germinate more readily.

Figures 1 and 2 disclose the seed cartridge made from a flat blank of paper or other fabric, adapted to be folded into tubular form,—with coordinating interlocking edges $A^2$, for securing the cartridge when folded. The blank may if desired be given a coating of paraffin, either before or after it is shaped into tubular form, to maintain the cartridge in finished tubular shape and also to prevent its too rapid disintegration when bedded.

By constructing a seed cartridge of transparent material, the condition of the plant E, and its tap root $E^1$ may be readily observed by the intending buyer before purchasing. Sufficient peat, moss or the like is lodged in the cartridge to afford nourishment and moisture to preserve the plant in a healthy condition until it is bedded in the open ground.

If desired, a balanced fertilizer may be added to the contents of the seed cartridge.

A seed bed having been previously prepared, the seed cartridge units are planted as may be desired by forcing the cartridge into the friable soil, thereby compacting the soil in the seed bed with the plant sustaining material in the cartridge, as previously explained.

It will now be seen that the cartridge serves not only as a container or housing for the embryo plant but as a "dibble" for planting.

It will be obvious that the embryo plant will readily take root through the openings $A^1$ in the cartridge in the soil surrounding the latter, without removing the plant from the cartridge.

A marked advantage gained through planting seeds as contemplated by this invention is that the intending purchasers may carefully examine the sprouted seeds or embryo plants before buying, and is thus assured of healthy seeds or plants before planting.

So also the embryo plants are protected from injury from the moment the seed germinates until the plants develop naturally in the soil of the bed in which they are ultimately planted.

Having thus described my invention, what I claim is:

1. A planting unit for gardens, comprising a transparent tubular cartridge of uniform cross-sectional area throughout and open at each end, and lateral openings through its tubular wall between the ends of the cartridge, adapted to lodge a seed or plant sustaining and feeding element and a seed or embryo plant bedded in said plant receiving element, the root system of said embryo plant being free to grow through the openings in the tubular wall of the cartridge and also the lower open end of the cartridge.

2. A planting unit for gardens, comprising a combined tubular cartridge and dibble open at opposite ends, adapted to receive a seed or embryo plant bedded in a plant sustaining element housed within said combined dibble and cartridge; said combined dibble and cartridge being adapted when forced into the soil of a previously prepared garden bed to compact the plant sustaining element in the planting unit, and also simultaneously unite and compact it with the soil in the seed bed in axial alignment therewith, whereby a capillary bond is effected, resulting from the pressure required to force the combined dibble and cartridge into said seed bed.

3. A planting unit for gardens, comprising a unitary tubular transparent cartridge and dibble open at each end, adapted to receive a seed or plant sustaining element lodged in said transparent cartridge and dibble, said transparent cartridge and dibble providing means, whereby the plant may be protected from accidental injury, and the development of its root system may be observed and examined before forcing the cartridge and dibble into a previously prepared garden bed.

4. A seed and an embryo plant merchandizing and planting unit for gardens, comprising a flat blank adapted for bending longitudinally to form a tubular container, said blank having a plurality of openings through its wall, with interlocking edges at each side of the blank, whereby upon bending the blank into tubular form, the edges of the blank when brought into abutting relation interlock, thereby securing the blank in tubular form.

5. A seed and an embryo plant merchandizing and planting cartridge for gardens, comprising a flat blank adapted to be bent, longitudinally with its edges abutting to form a tubular container, open at each end and of suitable shape in cross-section, said blank having a plurality of openings in its wall for the passage of the roots of an embryo plant; the outer edges of the blank being dove-tailed, whereby when shaping the blank into tubular form, its abutting edges may interlock to retain its tubular formation.

6. Means adapted for merchandising and planting seed and individual plants in an embryo state, comprising a tubular embryo plant container and dibble, open at each end of rigid construction, and of substantially uniform cross-sectional area throughout its length; a plant feeding and sustaining element housed within the container and dibble; said container and dibble being adapted to permit inspection of the embryo plant previous to planting, and for manually forcing the said plant sustaining element and embryo plant into the soil of the seed bed, whereby it may be compactly united with the soil of the seed bed without removing the embryo plant from the container and dibble, or causing injury to the plant, or disturbing its root system.

7. Means for merchandising and planting individual plants in an embryo state, comprising a transparent tubular dibble and embryo plant container, open at each end, of rigid construction, and of substantially uniform cross-sectional area throughout its length adapted to house a plant and a plant feeding and sustaining element within the dibble and container; said dibble and container being adapted for the inspection of the embryo plant previous to planting, and whereby said plant sustaining element, together with the embryo plant bedded therein may be manually forced into the soil of the seed bed and compactly united therewith, without removing the embryo plant from the container and dibble, or causing injury to the plant or its root system.

8. Means adapted for planting and merchandising individual plants, comprising a transparent tubular dibble and container, adapted to house an embryo plant, open at each end, with transverse openings through its side walls for the passage of the plant roots, said container being of substantially uniform cross-sectional area throughout its length and of rigid construction, whereby it may serve as a dibble and also as a container for a plant, and a plant feeding and sustaining element when lodged within the dibble and container.

9. Means for planting and merchandising individual plants, comprising a tubular dibble and container, adapted to house an embryo plant, with the name of the plant displayed upon the container, said container being open at each end, with transverse openings through its side walls for the passage of the plant roots, said container being of substantially uniform cross-sectional area throughout its length and of rigid construction, whereby it may serve as a dibble and also as an embryo plant container.

10. A merchandising seed or embryo plant planting unit for gardens, comprising a transparent tubular element of substantially uniform cross-sectional area throughout, open at each end and with lateral openings through its tubular wall between the open ends of the planting unit; said planting unit being adapted for the lodgement therein of a seed or plant sustaining and feeding element, including a seed or embryo plant bedded therein; whereby upon forcing said planting unit into the soil of a previously prepared garden bed, the plant sustaining element within the planting unit may be compacted with the soil of the seed bed in which it is forced, without injury to the roots of the embryo plant, said plant roots being free to grow through the openings provided in the planting unit into the soil in which the unit is forced.

11. Means for merchandising and planting seed or individual plants in an embryo state, comprising a combined tubular embryo plant container and dibble, open at each end, of substantially rigid construction and uniform cross-sectional area throughout its length, said combined container and dibble being adapted to house a plant feeding and sustaining element including a seed or embryo plant bedded in said plant feeding and sustaining element, said tubular embryo plant container and dibble being also adapted to permit inspection of the plant previous to planting, and for manually forcing the plant and its sustaining element housed therein into the soil of a previously prepared seed bed, whereby the plant sustaining element may be compacted with the soil of the seed bed without removing the container and dibble or causing injury to the plant, or disturbing its root system.

12. A merchandising and seed planting unit for gardens, comprising a combined tubular cartridge and dibble, open at opposite ends, adapted for housing therein a seed or embryo plant and a plant sustaining element, said combined dibble and cartridge upon being manually forced into the soil of a previously prepared garden bed being adapted to compact the plant sustaining element lodged therein and to unite it with the soil of the garden bed in axial alignment therewith; whereby a capillary bond may be effected, resulting from the pressure required to force the combined tubular cartridge and dibble into the soil of the garden bed.

RALPH B. OTWELL.